US012136018B1

(12) United States Patent
Marzorati et al.

(10) Patent No.: US 12,136,018 B1
(45) Date of Patent: Nov. 5, 2024

(54) ENHANCED SECURITY OF A BARCODE

(71) Applicant: INTERNATIONAL BUSINESS MACHINES CORPORATION, Armonk, NY (US)

(72) Inventors: Mauro Marzorati, Lutz, FL (US); Jeremy R. Fox, Georgetown, TX (US); Tiberiu Suto, Franklin, NY (US); Uri Kartoun, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/309,868

(22) Filed: May 1, 2023

(51) Int. Cl.
*G06K 7/14* (2006.01)
*G07C 9/00* (2020.01)

(52) U.S. Cl.
CPC ....... *G06K 7/1456* (2013.01); *G07C 9/00571* (2013.01)

(58) Field of Classification Search
CPC .......................... G06K 7/1456; G07C 9/00571
See application file for complete search history.

(56) References Cited

U.S. PATENT DOCUMENTS

| | | | |
|---|---|---|---|
| 6,543,694 B1 | 4/2003 | Detwiler | |
| 8,292,184 B2 | 10/2012 | Turbovich | |
| 10,997,581 B1* | 5/2021 | Phillips | G06Q 20/3276 |
| 11,206,939 B2 | 12/2021 | Sundaresan | |
| 11,346,150 B1 | 5/2022 | Johnston | |
| 11,427,385 B1 | 8/2022 | Cutter | |
| 2008/0052522 A1* | 2/2008 | Mcardle | H04L 9/3234 |
| | | | 713/182 |
| 2009/0224053 A1 | 9/2009 | Barkley | |
| 2011/0061100 A1* | 3/2011 | Mattila | G06F 21/36 |
| | | | 345/173 |
| 2012/0211567 A1 | 8/2012 | Herzig | |
| 2015/0248162 A1* | 9/2015 | Masson | G06F 3/0412 |
| | | | 345/173 |
| 2017/0091710 A1 | 3/2017 | Van Dyke | |
| 2018/0276365 A1* | 9/2018 | D'Alterio | G06F 21/36 |
| 2020/0402336 A1* | 12/2020 | Levy | G07C 9/00817 |
| 2021/0059456 A1* | 3/2021 | Fontanilla | A47G 29/16 |
| 2022/0210144 A1* | 6/2022 | Wagner | G06F 21/35 |

OTHER PUBLICATIONS

KR20070001477A—System for Preservation Exit and Entry Control Using Mobile Terminal, 8 Pages. (Year: 2024).*
Figat et al., "NAO-mark vs QR-code Recognition by NAO Robot Vision," Progress in Automation, Robotics and Measuring Techniques. Springer, Cham, 2015, pp. 55-64.

(Continued)

*Primary Examiner* — Tuyen K Vo
(74) *Attorney, Agent, or Firm* — Jordan T. Schiller

(57) ABSTRACT

A method for authorizing access to an associated resource based on processing a series of barcode orientation scans. The method receives, by a barcode reader, a series of barcode orientation scans. The method further determines if the series of barcode orientation scans match a pre-selected combination of barcode orientations stored on the barcode reader and authorizes access to an associated resource, in response to the series of barcode orientation scans matching the pre-selected combination of barcode orientations stored on the barcode reader.

17 Claims, 4 Drawing Sheets

(56) References Cited

OTHER PUBLICATIONS

IBM, "IBM Security Verify: IAM solutions", accessed Jan. 25, 2023, 8 pages, https://www.ibm.com/security/identity-access-management.

SAASPASS, "Scan Barcode, Instant Login with SAASPASS Provides Simple and Strong Two-factor Authentication", accessed on Jan. 25, 2023, 5 pages, https://saaspass.com/technologies/scan-barcode-instant-login-two-factor-authentication/.

Walmart Electronics, "Innovera IVRBLF22W 16:10 Aspect Ratio Blackout Privacy Filter for 22 in. Widescreen LCD Monitor", accessed on Jan. 25, 2023, 5 pages, https://www.walmart.com/ip/Innovera-Blackout-Privacy-Filter-For-22-Widescreen-LCD-Monitor-16-10-Aspect-Ratio/42210741.

Wikipedia, "Rotary combination lock", page was last edited on Nov. 5, 2021, 2 pages, https://en.wikipedia.org/wiki/Rotary_combination_lock.

\* cited by examiner

ENHANCED SECURITY OF A BARCODE

BACKGROUND

The present disclosure relates generally to the field of identity and access management and more particularly to data processing and controlling access to a resource based on scanning a barcode.

In today's digital world, security is a fundamental part of our daily lives. It is normal to have various cards in our wallets that contain a scannable barcode, or quick response (QR) code, that are used by various institutions to allow users to scan their personalized barcode to access different resources. For example, we use a library card with a scannable barcode to check-out library books.

However, if a user loses his/her card then anyone can use it.

BRIEF SUMMARY

Embodiments of the present invention disclose a method, a computer program product, and a system.

According to an embodiment, a method, in a data processing system including a processor and a memory, for authorizing access to an associated resource based on processing a series of barcode orientation scans. The method receives, by a barcode reader, a series of barcode orientation scans. The method further determines if the series of barcode orientation scans match a pre-selected combination of barcode orientations and authorizes access to an associated resource in response to the series of barcode orientations matching the predetermined combination of barcode orientations.

A computer program product, according to an embodiment of the invention, includes a non-transitory tangible storage device having program code embodied therewith. The program code is executable by a processor of a computer to perform a method. The method receives, by a barcode reader, a series of barcode orientation scans. The method further determines if the series of barcode orientation scans match a pre-selected combination of barcode orientations and authorizes access to an associated resource in response to the series of barcode orientations matching the predetermined combination of barcode orientations.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method receives, by a barcode reader, a series of barcode orientation scans. The method further determines if the series of barcode orientation scans match a pre-selected combination of barcode orientations and authorizes access to an associated resource in response to the series of barcode orientations matching the predetermined combination of barcode orientations.

DETAILED DESCRIPTION

Figure 1:
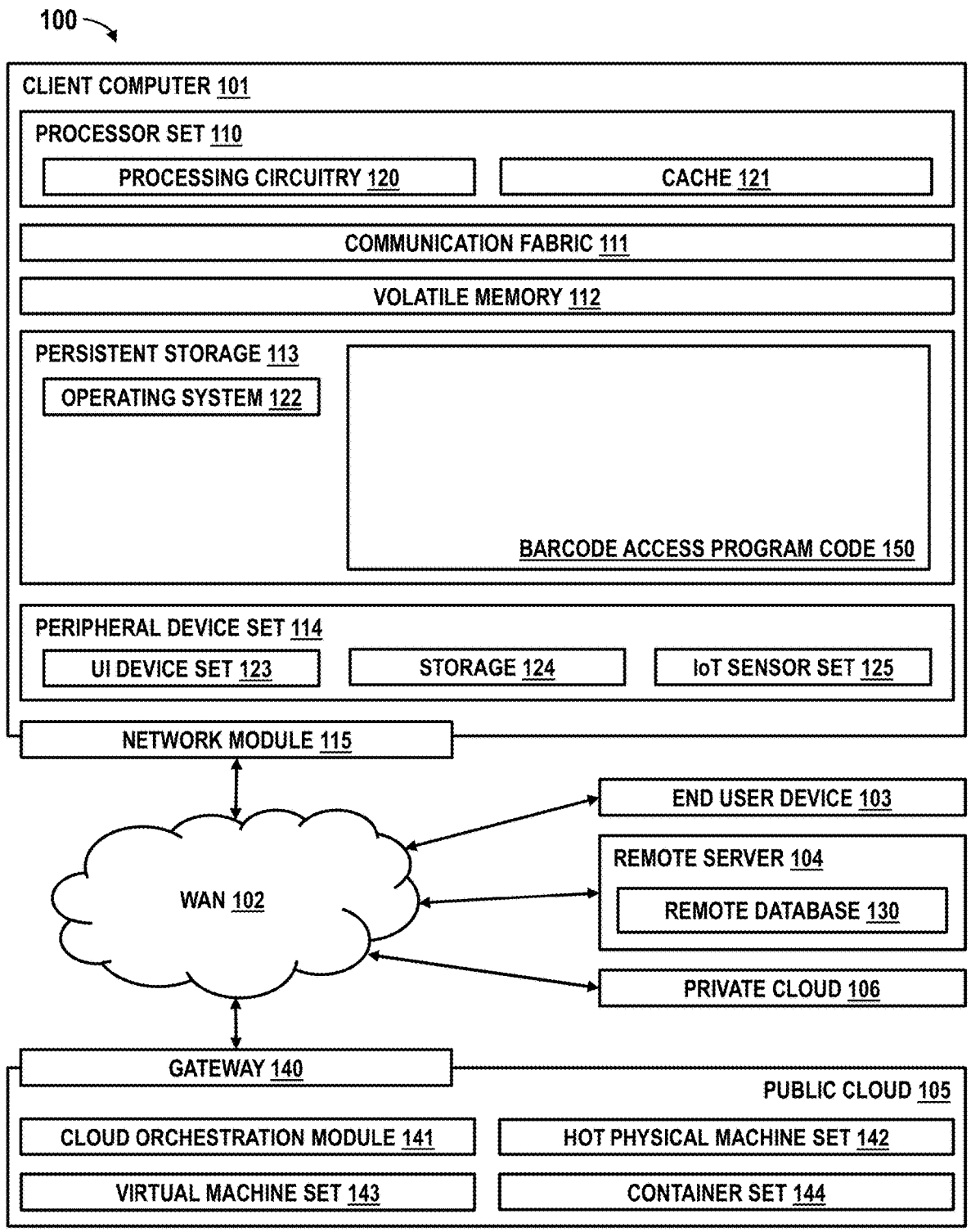
FIG. 1 depicts a diagram graphically illustrating the hardware components of barcode access program computing environment 200 and a cloud computing environment, in accordance with an embodiment of the present invention.

Scanning a barcode or a QR code is accessible to anyone who is in possession of the barcode or QR code. Once scanned, access to a resource may be granted. The consequences of access to an unauthorized user of a stolen, or found, barcode or QR code could be detrimental. For example, identification (ID) badges at a workplace may grant access to areas where certain individuals are not permitted.

The present invention utilizes the concept of an old-fashioned rotary dial combination padlock (e.g., used to secure lockers, bicycles, cabinets, storage compartments, etc.) and introduces a digital element to allow a user to turn their mobile device (e.g., smartphone) into a next generation locking mechanism. As such, the present invention provides a unique method to generate a digital combination lock on a barcode, and provides a unique and tailored user experience to a specific individual.

The old-fashioned rotary dial combination padlock typically utilizes a three (3) number combination system that allows them to remain locked and secure, until a user utilizes the pre-set combination code in a series of turns on the rotary dial. For example, to unlock a rotary dial combination padlock with manufacturer provided code "7", "25", "35", the user needs to perform the following "combination" unlocking process: first, turn to RIGHT 3 turns and stop at "7"; next, turn to LEFT one full turn past "25"; then, turn to RIGHT, stop at "35" and pull lock open.

Currently, barcodes are not a secured technology. Various institutions and companies (e.g., libraries, corporate ID badges, etc.) allow users to scan a personalized barcode card to access different resources. If a user loses their personalized barcode card, then anyone who finds it can use it.

The present invention proposes a method for using a combination of poses, or orientations, of a given barcode to authorize access to an associated resource. As such, any barcode becomes personalized and secure.

For example, a user may have a personalized "combination" (e.g., "3", "8", "1") and presents the personalized barcode card to the card reader at different angles corresponding to their personalized "combination", within an allotted amount of time (e.g., 30 seconds).

The present invention allows a user to turn a physical barcode, QR code, or other type of physical object, and converts that into a digital reference point for a combination style locking algorithm.

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not show actual dimensions.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in each flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in each CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

FIG. 1 depicts a diagram graphically illustrating the hardware components of computing environment 100 and a cloud computing environment in accordance with an embodiment of the present invention.

Computing environment 100 contains an example of an environment for the execution of at least some of the computer code involved in performing the inventive methods, such as barcode access program code 150. In addition to the infrared access program code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and infrared access program code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that can run a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121, and the other storage media discussed below. The program instructions, and associated data, are accessed by processor set 110 to control and direct performance of the inventive methods. In computing environment 100, at least some of the instructions for performing the inventive methods may be stored in infrared access program code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open-source Portable Operating System Interface type operating systems that employ a kernel. The code included in improved electric vehicle charging scheduler program code 400 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
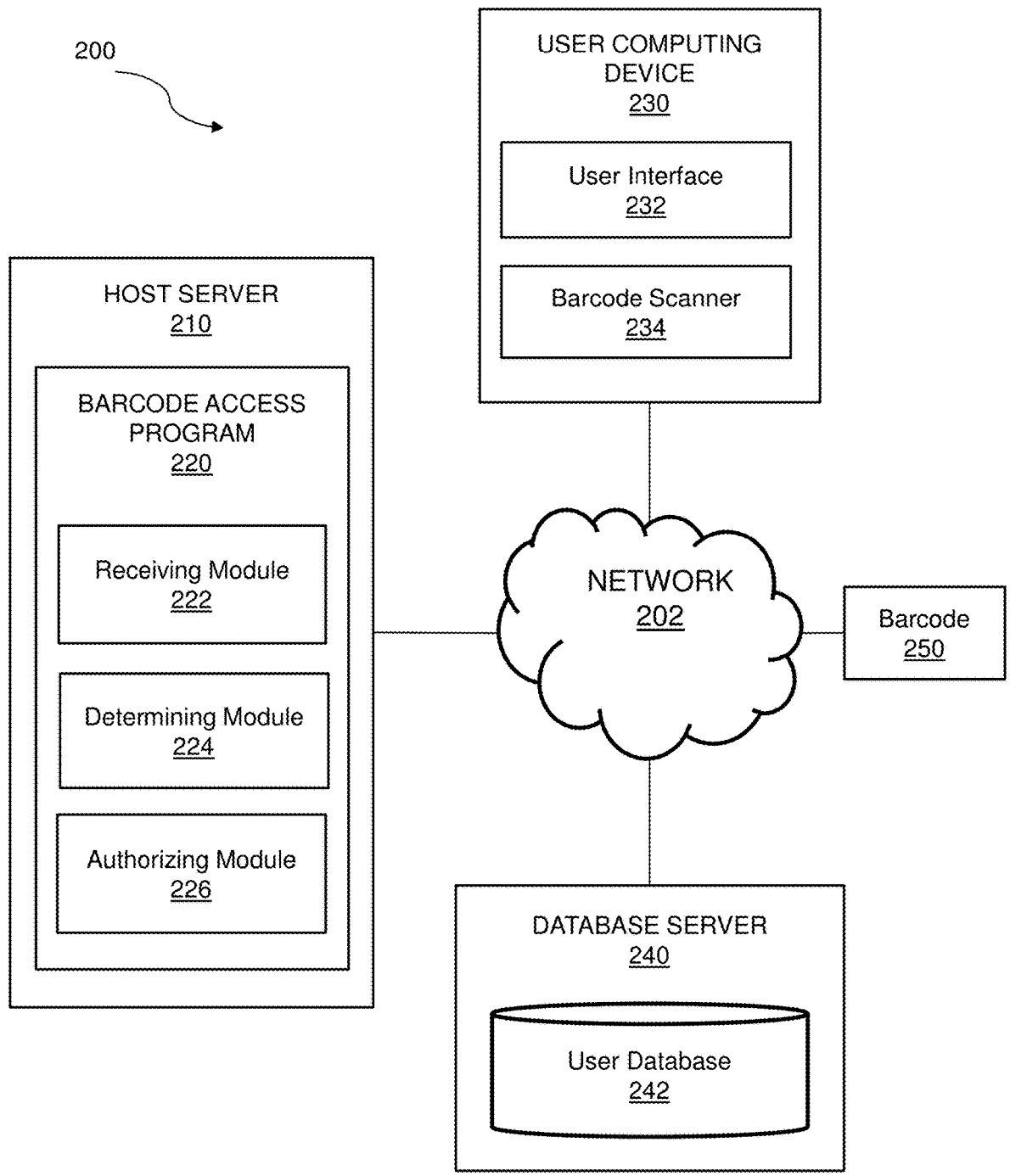
FIG. 2 illustrates barcode access program computing environment 200, in accordance with an embodiment of the present invention.

FIG. 2 illustrates barcode access computing environment 200, in accordance with an embodiment of the present invention. Barcode access computing environment 200 includes host server 210, user computing device 230, database server 240, and barcode 250 all connected via network 202. The setup in FIG. 2 represents an example embodiment configuration for the present invention and is not limited to the depicted setup to derive benefit from the present invention.

In an exemplary embodiment, host server 210 includes barcode access program 220. In various embodiments, host server 210 may be a laptop computer, tablet computer, netbook computer, personal computer (PC), a desktop computer, a personal digital assistant (PDA), a smart phone, or any programmable electronic device capable of communicating with user computing device 230, database server 240, and barcode 250 via network 202. Host server 210 may include internal and external hardware components, as depicted, and described in further detail with reference to FIG. 1. In other embodiments, host server 210 may be implemented in a cloud computing environment, as further described in relation to FIG. 1. Host server 210 may also have wireless connectivity capabilities allowing it to communicate with user computing device 230, database server 240, barcode 250, and other computers or servers over network 202.

With continued reference to FIG. 2, user computing device 230 includes user interface 232 and barcode scanner 234. In various embodiments, user computing device 230 may be a laptop computer, tablet computer, netbook computer, personal computer (PC), a desktop computer, a personal digital assistant (PDA), a smart phone, a server, a wearable device, or any programmable electronic device capable of communicating with host server 210, database server 240, and barcode 150, via network 202. User computing device 230 may include internal and external hardware components, as depicted, and described in further detail with reference to FIG. 1. In other embodiments, user computing device 230 may be implemented in a cloud computing environment, as described in relation to FIG. 1. User computing device 230 may also have wireless connectivity capabilities allowing it to communicate with host server 210, database server 240, barcode 150, and other computers or servers over network 202.

In exemplary embodiments, user computing device 230 includes user interface 232, which may be a computer program that allows a user to interact with user computing device 230 and other connected devices via network 202. For example, user interface 232 may be a graphical user interface (GUI). In addition to comprising a computer program, user interface 232 may be connectively coupled to hardware components, such as those depicted in FIG. 1, for sending and receiving data. In an exemplary embodiment, user interface 232 may be a web browser, however in other embodiments user interface 232 may be a different program capable of receiving user interaction and communicating with other devices, such as host server 210.

In exemplary embodiments, user interface 232 may be a touch screen display, a visual display, a remote operated display, or a display that receives input from a physical keyboard or touchpad. In alternative embodiments, user interface 232 may be operated via voice commands or by any other means known to one of ordinary skill in the art.

Barcode scanner 234, in exemplary embodiments, may be a software application located on user computing device 230 and used for capturing images of barcodes (e.g., barcode 250), QR codes, or any other type of scanning code known to one of ordinary skill in the art.

In exemplary embodiments, barcode scanner 234 may include a bezel that is part of an overlay on user computing device 230. A bezel is a space or frame around a display device, such as user computing device 230. For example, the bezel around the designated capture area on a scanning device may be a face-based circle number array, like a clock. In this fashion, a barcode 250 (or the scanning device) can be tilted in various orientations to enter a combination code corresponding to the face-based circle number array.

In various embodiments, barcode scanner 234 may be embedded within user computing device 230 and contain a computer processing unit (CPU), memory, and power resource, and may be capable of communicating with host server 210 and database server 240 over network 202.

In alternative embodiments, barcode scanner 234 may be a software application that a user downloads to their user computing device 230.

In exemplary embodiments, database server 240 includes user database 242. In various embodiments, database server 240 may be a laptop computer, tablet computer, netbook computer, personal computer (PC), a desktop computer, a personal digital assistant (PDA), a smart phone, a server, or any programmable electronic device capable of communicating with host server 210, user computing device 230, and barcode 250, via network 202. Database server 240 may include internal and external hardware components, as depicted, and described in further detail with reference to FIG. 1. In other embodiments, database server 240 may be implemented in a cloud computing environment, as described in relation to FIG. 1. Database server 240 may also have wireless connectivity capabilities allowing it to communicate with host server 210, user computing device 230, barcode 250, and other computers or servers over network 202.

In exemplary embodiments, user database 242 contains one or more sets of defined user profiles, associated access permissions, privileges, and combinations for various personalized barcode cards of a user.

While user database 242 is depicted as being stored on database server 240, in other embodiments, user database 242 may be stored on user computing device 230, host server 210, barcode access program 220, or any other device or database connected via network 202, as a separate database. In alternative embodiments, user database 242 may be comprised of a cluster or plurality of computing devices, working together, or working separately.

With continued reference to FIG. 2, barcode 250 may include a bar code, QR code, universal product code (UPC), radio frequency identification (RFID), biometrics, magnetic stripes, optical character recognition (OCR), smart cards, or any other similar technology for obtaining external data, particularly through the analysis of images, sounds, or videos known to one of ordinary skill in the art.

In exemplary embodiments, the proposed invention enhances security of any application that utilizes barcodes 250, including scanning of parcels in a personalized way.

With continued reference to FIG. 2, host server 210 includes barcode access program 220. Host server 210 may be a laptop computer, tablet computer, netbook computer, personal computer (PC), a desktop computer, a personal digital assistant (PDA), a smart phone, or any programmable electronic device capable of communicating with user computing device 230, database server 240, and barcode 250, via network 202.

With continued reference to FIG. 2, barcode access program 220, in an exemplary embodiment, may be a computer application on host server 210 that contains instruction sets, executable by a processor. The instruction sets may be described using a set of functional modules. In exemplary embodiments, barcode access program 220 may receive input from user computing device 230, database server 240, and barcode 250, over network 202. In alternative embodiments, barcode access program 220 may be a computer application on user computing device 230, or a standalone program on a separate electronic device.

With continued reference to FIG. 1, the functional modules of barcode access program 220 include receiving module 222, determining module 224, and authorizing module 226.

Figure 3:
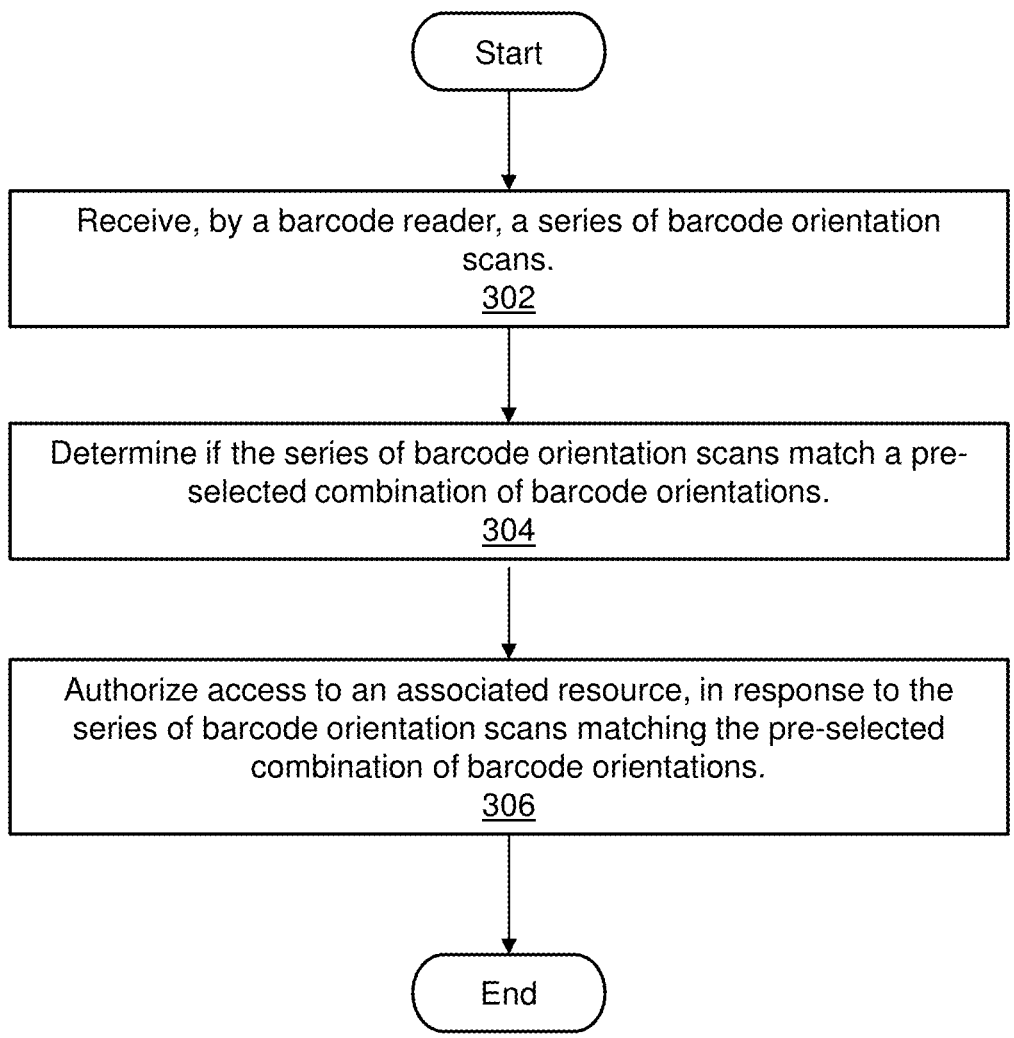
FIG. 3 is a flowchart illustrating the operation of barcode access program 220 of FIG. 2, in accordance with an embodiment of the present invention.

FIG. 3 is a flowchart illustrating the operation of barcode access program 220 of FIG. 2, in accordance with embodiments of the present disclosure.

With reference to FIGS. 2 and 3, receiving module 222 includes a set of programming instructions, in barcode access program 220, to receive, by a barcode reader, a series of barcode orientation scans (step 302). The set of programming instructions is executable by a processor.

In exemplary embodiments, the series of barcode orientation scans are obtained by the user manually rotating the barcode (e.g., library card, ID badge, etc.) underneath the barcode reader in a pattern that corresponds to a combination of two or more numbers, wherein the numbers are in the form of clock numbers, such as a round number array with the numbers one (1) through twelve (12) in a clockwise circle.

In exemplary embodiments, the barcode is rotated by a user within a rotational pattern to select a combination of multiple numbers on a face-based circle number array.

In alternative embodiments, the barcode reader is part of an overlay on a handheld computing device (e.g., user computing device 230) and wherein the handheld computing device is rotated, by the user, within a rotational pattern around the barcode to select a combination of multiple numbers on the face-based circle number array.

Figure 4:
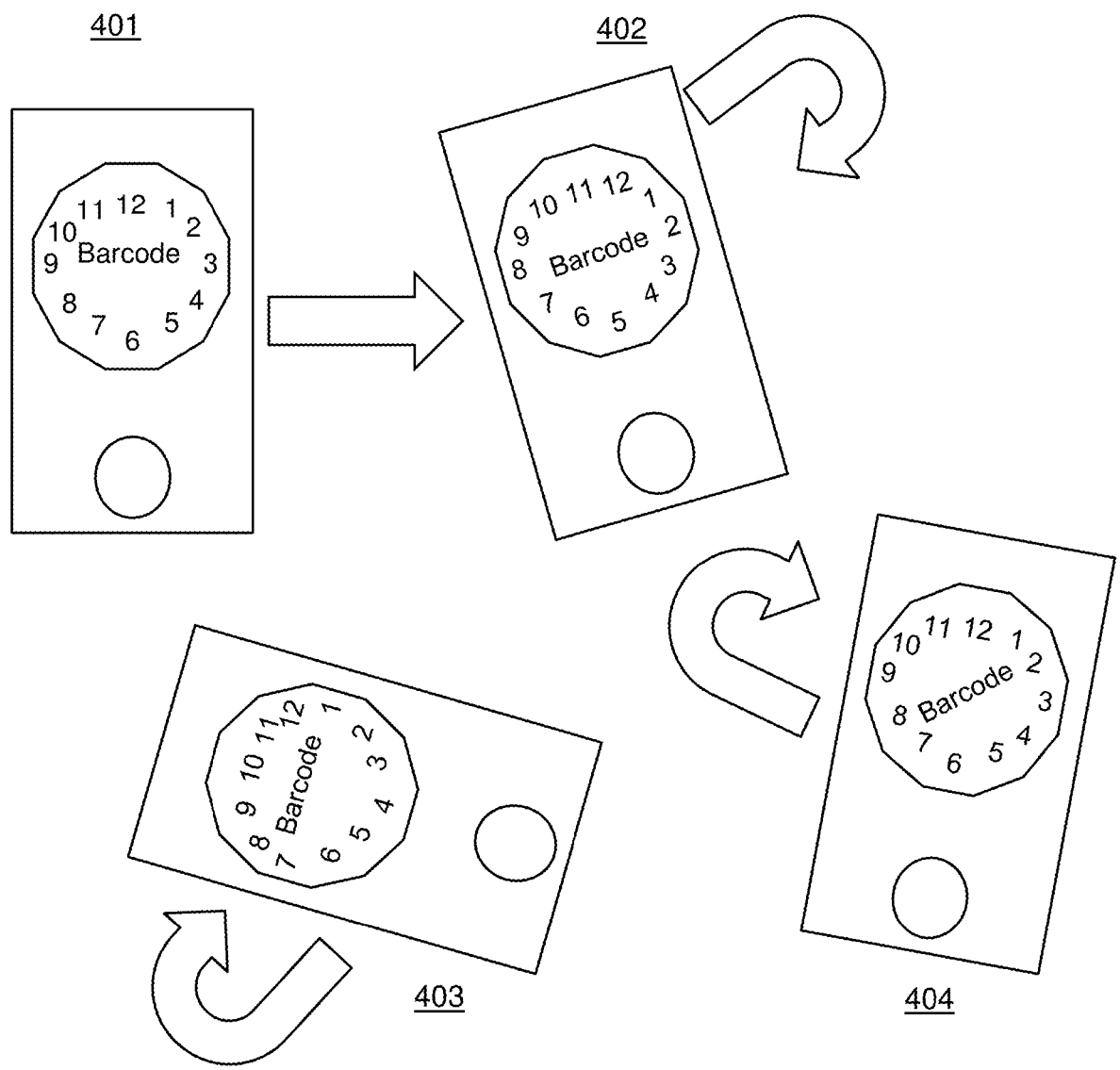
FIG. 4 depicts the rotation of a user's smartphone around a barcode to select a combination of multiple numbers on the face-based circle number array, in accordance with an embodiment of the present invention.

FIG. 4 depicts the rotation of a user's smartphone around a barcode to select a combination of multiple numbers on the face-based circle number array.

With reference to FIG. 4, 401 depicts barcode scanner 234 with a face-based circle number array overlay, on user computing device 230. 402 depicts the user rotating the smartphone counterclockwise, while continuing to hold the device over the barcode, and stopping at "2".

With continued reference to FIG. 4, 403 depicts the user rotating the smartphone clockwise, all the while continuing to hold the device over the barcode and stopping at "7". 404 depicts the user rotating the smartphone slightly clockwise and stopping at "8". The combination for effectively scanning the barcode and gaining access to the associated resource is "2", "7", then "8".

In alternative embodiments, the series of barcode orientation scans may be arranged in a pattern that corresponds to a combination of two or more unique identifiers. For example, the combination of two or more unique identifiers may include pictures, signs, emojis, movements, sounds, touches, or any other unique identifier, pattern, combination, or orientation known to one of ordinary skill in the art.

In alternative embodiments, the pre-selected combination of barcode orientations is stored on a user device (e.g., smartphone, tablet, etc.) and contains a privacy enhanced liquid-crystal display (LCD) viewable only from an angle of the user device.

In exemplary embodiments, the series of barcode orientation scans are absolute rotational readings, meaning the rotation of the barcode is independent of any external reference.

In alternative embodiments, the series of barcode orientation scans are relative rotational readings.

With reference to an illustrative example, Jessica enjoys the library but worries about losing her library card. She sees that the library is now offering a new security scanning service when she scans her card to check-out books. Jessica likes this concept, as it provides her with extra security if someone ever steals her library card or if she accidentally loses it. Jessica proceeds to scan her library card when she goes to check-out her books. She holds her library card under the optical scanner and rotates her library card based on fixed scanning points. Receiving module 222 receives the inputs of each orientation of Jessica's library card as she rotates her card right and left within a rotational pattern, at fixed scanning points, to input various numbers ("3", "8", "1"), like entering digits on a combination padlock, on a face-based style of circle number array.

With continued reference to FIGS. 2 and 3, determining module 224 includes a set of programming instructions in barcode access program 220, to determine if the series of barcode orientation scans match a pre-selected combination of barcode orientations (step 304). The set of programming instructions is executable by a processor.

In exemplary embodiments, the pre-selected combination of barcode orientations that ultimately grants access to the associated resource, may be stored on barcode access program 220, user computing device 230, barcode scanner 234, and user database 242.

In exemplary embodiments, the pre-selected combination of barcode orientations is selected offline by a user. The user sets up a selection of digital content to be protected by barcode 250 and sets up a passcode, or process, for unlocking the digital gate.

In alternative embodiments, the pre-selected combination of barcode orientations may be selected at random by barcode access program 220, user computing device 230, or barcode scanner 234.

In alternative embodiments, the pre-selected combination of barcode orientations, together with associated access permissions, may be stored on barcode access program 220 or user computing device 230, as a separate database.

With continued reference to the illustrative example above, Jessica rotates her library card under the barcode scanner with the series of barcode orientation scans ("3", "8", "1"). Determining module then matches up the series of barcode orientations scans with the pre-selected combination of barcode orientations stored on the barcode reader. If Jessica's combination of scans ("3", "8", "1") match, then she'll be permitted to check-out the library books. If Jessica's combination of scans does not match the pre-selected combination of barcode orientations stored on the barcode reader, then Jessica will not be permitted to check-out the library books.

With continued reference to FIGS. 2 and 3, authorizing module 226 includes a set of programming instructions in barcode access program 220, to authorize access to an associated resource, in response to the series of barcode orientation scans matching the pre-selected combination of barcode orientations (step 306). The set of programming instructions is executable by a processor.

In exemplary embodiments, the associated resource is a digital resource and is at least one of a computer, a website, a software application, or an automated teller machine (ATM).

In exemplary embodiments, the associated resource is a physical resource and is at least one of a door, a window, an entryway, a passageway, or an ignition system of a machine.

In exemplary embodiments, authorizing module 226 processes the received data from the barcode scanner (e.g., user computing device 230) and compares/matches the received data with a central database (e.g., user database 242) to validate the accuracy of the combination information. If the received data is validated, then authorizing module 226 will return a positive authentication, otherwise it will reject the authentication.

With continued reference to the illustrative example above, authorizing module 226 grants access to Jessica's library account. The librarian can see that Jessica has no overdue books or fines and that the library card belongs to Jessica since she correctly scanned her barcode with the correct series of barcode orientations scans. Jessica is permitted to check-out her library books.

In alternative embodiments, the scanning device may contain a privacy enabled LCD readout viewable from only the angle of the user.

In alternative embodiments, the barcode card issued to a user is activated by the user placing the barcode card on the scanning device in a series of two or more poses, or orientations, that become the user's secure access orientations for future card use.

In exemplary embodiments, the LCD display will show the rotational reading detected. In some embodiments, this may be based upon a 360-degree rotation. Additionally, embodiments may use a divisor to generate a more limited set of rotation angles, thus making it easier to enable balancing security and usability aspects. For example, using a divisor of 9 provides 40 available rotational readings, which is equivalent to a combination padlock. Using a divisor of 30 provides 12 available readings, which is equivalent to a clock.

To provide enhanced security, user computing device 230 sets the initial angle from a random offset to prevent nearby observers from guessing the combination either via observation or video recording. For example, for a device using a divisor of 30 (clock equivalent) and the 3 numbers in the user combination are "3", "9", "1", without the security component a person would place their card at the 90-degree position, then rotate it 180-degrees, and then rotate it backwards 240-degrees. However, with the security-enabled reader, the user can place their card at any random angle, check the readout of the display and then rotate it until the first number in the combination is reached according to the display readout. As such, instead of the first angle being 90-degrees, it might be 270-degrees or any other angle, thus preventing any observers from guessing the combination.

In further exemplary embodiments, the multiplier used by user computing device 230 may change between the different readings. So, instead of the second combination number requiring a 180-degree offset (for multiplier of 30), it may instead require a 90-degree offset if the multiplier was changed to 15 between the first and second readings in the combination.

In exemplary embodiments, network 202 is a communication channel capable of transferring data between connected devices and may be a telecommunications network used to facilitate telephone calls between two or more parties comprising a landline network, a wireless network, a closed network, a satellite network, or any combination thereof. In another embodiment, network 202 may be the Internet, representing a worldwide collection of networks and gateways to support communications between devices connected to the Internet. In this other embodiment, network 202 may include, for example, wired, wireless, or fiber optic connections which may be implemented as an intranet network, a local area network (LAN), a wide area network (WAN), or any combination thereof. In further embodiments, network 202 may be a Bluetooth network, a WiFi network, or a combination thereof. In general, network 202 can be any combination of connections and protocols that will support communications between host server 210, user computing device 230, database server 240.

The invention claimed is:

1. A computer-implemented method for authorizing access to an associated resource based on processing a series of barcode orientation scans, the computer-implemented method comprising:

receiving, by a barcode reader, a series of barcode orientation scans, wherein the barcode is rotated, by a user, within a rotational pattern to select a combination of multiple numbers on a face-based circle number array, and wherein an initial angle of the series of barcode orientation scans is set from a random offset of the face-based circle number array;

determining if the series of barcode orientation scans match a pre-selected combination of barcode orientations; and authorizing access to an associated resource, in response to the series of barcode orientation scans matching the pre-selected combination of barcode orientations.

2. The computer-implemented method of claim 1, wherein the pre-selected combination of barcode orientations is selected offline by a user.

3. The computer-implemented method of claim 1, wherein the associated resource is a digital resource and is at least one of a computer, a website, or an automated teller machine (ATM).

4. The computer-implemented method of claim 1, wherein the associated resource is a physical resource and is at least one of a door, a window, or an ignition system of a machine.

5. The computer-implemented method of claim 1, wherein the barcode reader is part of an overlay on a handheld computing device and wherein the handheld computing device is rotated, by the user, within a rotational pattern around the barcode to select a combination of multiple numbers on the face-based circle number array.

6. The computer-implemented method of claim 1, wherein the pre-selected combination of barcode orientations is stored on a user device and contains a privacy enhanced liquid-crystal display (LCD) viewable only from an angle of the user device.

7. A computer program product, comprising a non-transitory tangible storage device having program code embodied therewith, the program code executable by a processor of a computer to perform a method, the method comprising:
   receiving, by a barcode reader, a series of barcode orientation scans, wherein the barcode is rotated, by a user, within a rotational pattern to select a combination of multiple numbers on a face-based circle number array, and wherein an initial angle of the series of barcode orientation scans is set from a random offset of the face-based circle number array;
   determining if the series of barcode orientation scans match a pre-selected combination of barcode orientations; and
   authorizing access to an associated resource, in response to the series of barcode orientation scans matching the pre-selected combination of barcode orientations.

8. The computer program product of claim 7, wherein the pre-selected combination of barcode orientations is selected offline by a user.

9. The computer program product of claim 7, wherein the associated resource is a digital resource and is at least one of a computer, a website, or an automated teller machine (ATM).

10. The computer program product of claim 7, wherein the associated resource is a physical resource and is at least one of a door, a window, or an ignition system of a machine.

11. The computer program product of claim 7, wherein the barcode reader is part of an overlay on a handheld computing device and wherein the handheld computing device is rotated, by the user, within a rotational pattern around the barcode to select a combination of multiple numbers on the face-based circle number array.

12. The computer program product of claim 7, wherein the pre-selected combination of barcode orientations is stored on a user device and contains a privacy enhanced liquid-crystal display (LCD) viewable only from an angle of the user device.

13. A computer system, comprising:
   one or more computer devices each having one or more processors and one or more tangible storage devices; and
   a program embodied on at least one of the one or more storage devices, the program having a plurality of program instructions for execution by the one or more processors, the program instructions comprising instructions for:
      receiving, by a barcode reader, a series of barcode orientation scans, wherein the barcode is rotated, by a user, within a rotational pattern to select a combination of multiple numbers on a face-based circle number array, and wherein an initial angle of the series of barcode orientation scans is set from a random offset of the face-based circle number array;
      determining if the series of barcode orientation scans match a pre-selected combination of barcode orientations; and
      authorizing access to an associated resource, in response to the series of barcode orientation scans matching the pre-selected combination of barcode orientations.

14. The computer system of claim 13, wherein the pre-selected combination of barcode orientations is selected offline by a user.

15. The computer system of claim 13, wherein the associated resource is a digital resource and is at least one of a computer, a website, or an automated teller machine (ATM).

16. The computer system of claim 13, wherein the associated resource is a physical resource and is at least one of a door, a window, or an ignition system of a machine.

17. The computer system of claim 13, wherein the barcode reader is part of an overlay on a handheld computing device and wherein the handheld computing device is rotated, by the user, within a rotational pattern around the barcode to select a combination of multiple numbers on the face-based circle number array.

* * * * *